Aug. 12, 1958   R. T. POUNDS ET AL   2,847,539
CONTROL DEVICE
Filed Sept. 13, 1956   9 Sheets-Sheet 1

INVENTORS
RICHARD T. POUNDS
LEROY L. GREEN
BY
ATTORNEYS

Fig. 4

Aug. 12, 1958    R. T. POUNDS ET AL    2,847,539
CONTROL DEVICE

Filed Sept. 13, 1956    9 Sheets-Sheet 4

INVENTORS
RICHARD T. POUNDS
LEROY L. GREEN
BY
ATTORNEYS

Aug. 12, 1958   R. T. POUNDS ET AL   2,847,539
CONTROL DEVICE

Filed Sept. 13, 1956   9 Sheets-Sheet 8

INVENTORS
RICHARD T. POUNDS
LEROY L. GREEN

BY Strauch, Nolan & Neale

ATTORNEYS

Aug. 12, 1958 R. T. POUNDS ET AL 2,847,539
CONTROL DEVICE

Filed Sept. 13, 1956 9 Sheets-Sheet 9

INVENTORS
RICHARD T. POUNDS
LEROY L. GREEN
BY
ATTORNEYS

United States Patent Office 2,847,539
Patented Aug. 12, 1958

1

2,847,539

CONTROL DEVICE

Richard T. Pounds, Goshen, Ind., and Leroy L. Green, Columbus, Ohio, assignors, by mesne assignments, to Robertshaw-Fulton Controls Company, Greensburg, Pa., a corporation of Delaware Application September 13, 1956, Serial No. 609,569

26 Claims. (Cl. 200—138)

This invention relates to temperature sensitive control instruments and more particularly to an improved mechanical construction mounting arrangement for the parts thereof.

It is a principal object of the present invention to provide a novel construction for a thermostat which is rugged, yet adequately sensitive for proper operation and formed of novel sub-assemblies which are easy to assemble to thereby provide an inexpensive thermostat.

Another object of the invention is to provide a novelly formed control instrument base having permanently secured sub-assemblies which when mechanically secured to the wall plate are simultaneously electrically connected to the thermostat control circuit.

A further object of the present invention is to provide as a sub-assembly on a thermostat base a novel mounting plate for the anticipating heater resistance and related components.

A still further object of the present invention is to provide a novel switch contact enclosure which cooperates with other elements of the control device forming a rugged but yet sensitive instrument.

Still another object of the invention is to provide a novel dial plate housing and a sub-assembly including the thermostat adjustment arm.

A still further object of the invention is to provide a novel mounting for a convex cover which is secured to the dial plate housing and completely surrounds the base in a spaced relationship to avoid the necessity of controlling manufacturing tolerances between the dial plate housing, cover and base.

These and other objects of the invention will become more fully apparent from the claims, and as the following description proceeds in conjunction with the appended drawings wherein:

Figure 5 is a plan view of the wall mounting plate as it appears on the wall with the main portion of the control instrument removed;

2

Figure 19 is a plan view of the thermostat partly assembled showing the mounting plate and bimetal element as they appear during an intermediate stage of manufacture;

Figures 1, 2:
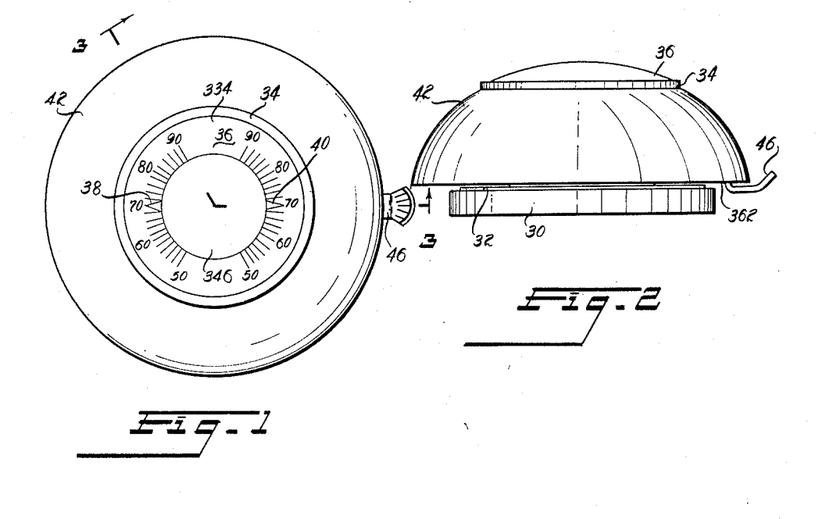
Figure 1 is a plan view of the control instrument completely assembled.
Figure 2 is a side view of the instrument of Figure 1.

Referring now to the drawings wherein like reference numerals have been used throughout the several views to indicate the same parts, Figures 1 and 2 show top and side views respectively of the thermostat or control instrument in accordance with the present invention. The thermostat is supported by a wall mounting plate 30 which is adapted to be secured on a vertical wall of the enclosure in which the temperature is to be controlled. The thermostat further includes a base 32 on which the elements forming the thermostat proper are mounted, a dial housing 34 in which a transparent cover plate 36 is retained through which the dial or calibrated scale plate 334 and cooperating indices 38 and 40 are visible, and a removable cover 42. Index 38 is a pointer on a bimetal thermometer 44 supported in housing 34. Index 40, also shown in Figure 3, is connected to thermostat control arm 46 to provide an indication of the setting of the thermostat.

Figure 3:
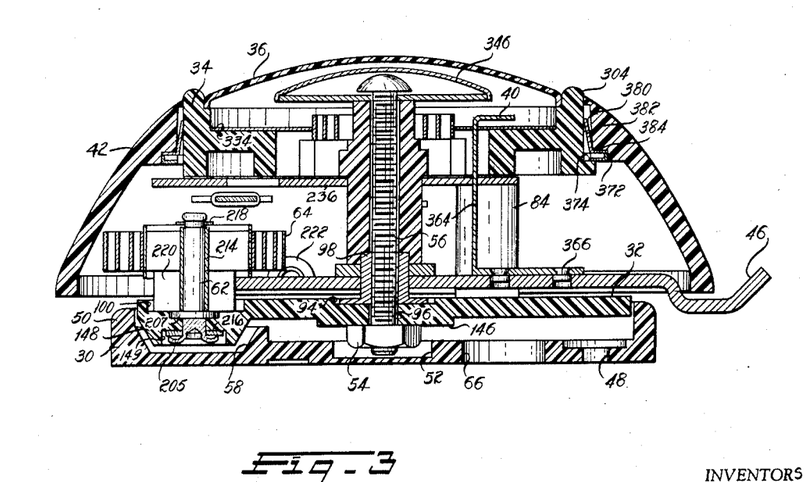
Figure 3 is side view in section along lines 3—3 of Figure 1.
Figure 4:
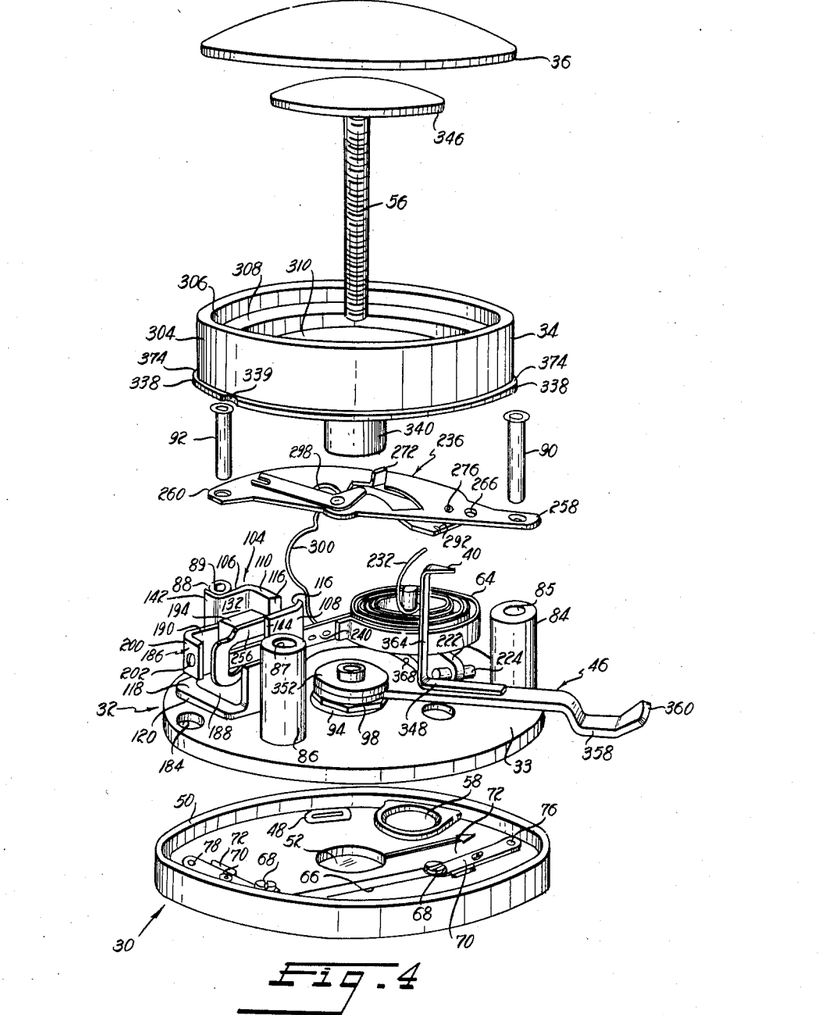
Figure 4 is a pictorial exploded view of the entire control instrument except cover 42 in accordance with the present invention.

Figure 3 is an elevation in section taken along lines 3—3 of Figure 1 and in general shows the interior construction of the thermostat in accordance with the present invention. Figure 4 is an exploded pictorial view also showing the general overall assembly and repeated reference to these two figures as the detailed description proceeds will be helpful.

A plan view of wall mounting plate 30 is shown in

Figure 5 as it appears when mounted on a wall with the visible face adapted to receive base 32 of the thermostat. Wall plate 30 in the illustrated embodiment has a generally flat circular appearance and is preferably formed of a moldable insulating material such as a phenolic and is provided with screw or fastener receiving apertures 48 to permit proper positioning of the thermostat and wall plate upon the wall. A flanged edge 50 extends around the periphery of the plate 30 to receive base 32 best shown in Figures 2, 3 and 4. A central circular recess 52 is provided to receive nut 54 on screw 56 which rigidly secures dial plate housing 34 to base 32. Recess 58 is provided in wall mounting plate 30 for receiving boss 148 on base 32 located beneath shaft 62 supporting the thermostat bimetal element 64 to base 32.

Figure 20:
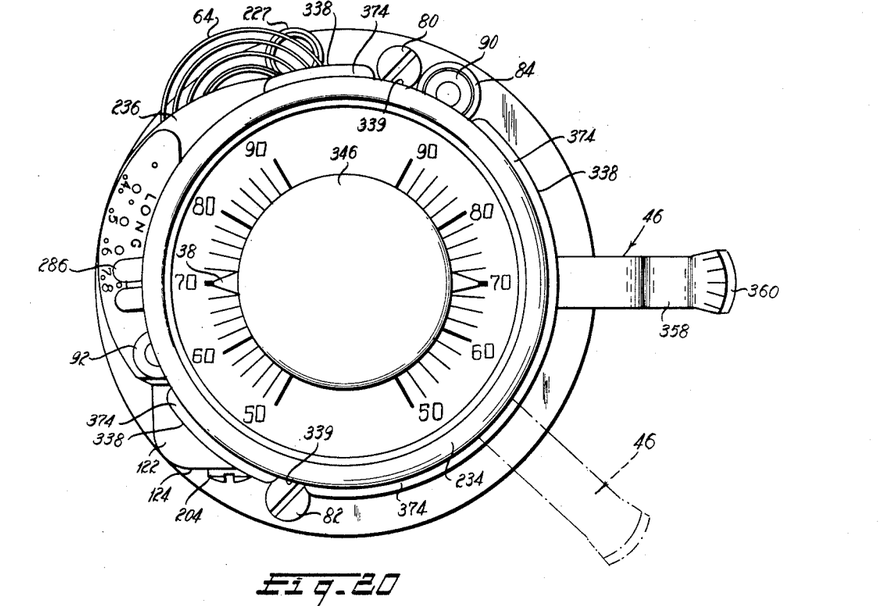
Figure 20 is a plan view of the completely assembled thermostat with cover 42 and wall mounting plate 30 removed.

An elongated aperture 66 is provided in wall plate 30 for receiving the two wires from the other circuit components in a thermostat control system which conventionally are brought through the surface of the wall at the position of the thermostat with screws 68 being provided to secure the ends of the wires to the thermostat both mechanically and electrically. Screws 68 are threadedly received in elongated metal lugs 70 which are secured in position between elongated bosses 72 as by rivets 74. At the ends of lugs 70 opposite from screws 68 there are provided threaded apertures 76 and 78 diametrically opposite one another and located near the periphery of wall mounting plate 30 for receiving screw fasteners 80 and 82 in base 32 as shown in Figures 6, 19 and 20.

Figures 6, 7, 8, 9, 10:
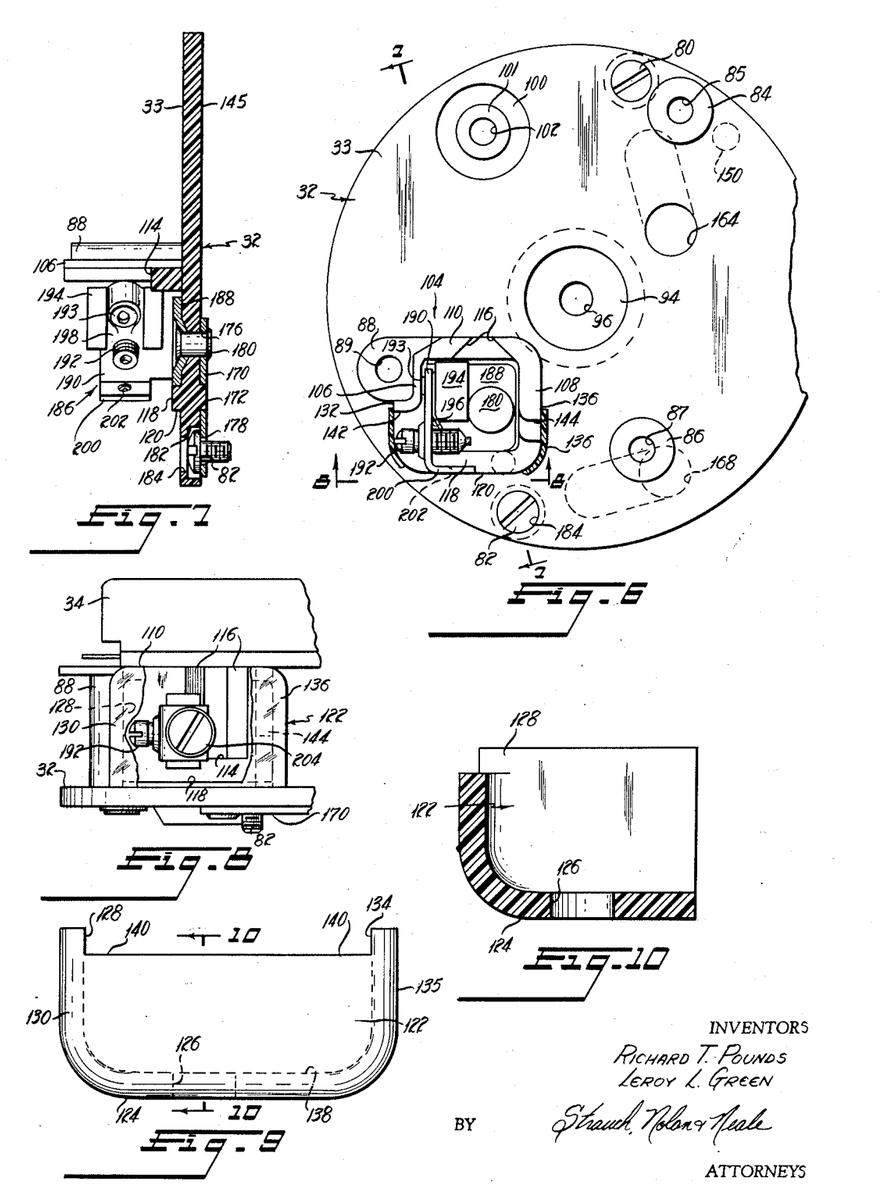
Figure 6 is a plan view of the base on which the principal components of the thermostat are assembled showing the switch contact sub-assembly secured thereto.
Figure 7 is an elevation view in section along lines 7—7 of Figure 6 illustrating the means for mounting the fixed switch contact structure and adjacent lug to the base.
Figure 8 is a partial view in elevation taken along lines 8—8 of Figure 6 illustrating the switch contact shield and additionally showing part of the dial plate housing as it appears when assembled.
Figure 9 is a plan view of shield 122 shown in Figure 8.
Figure 10 is a view of shield 122 in section along lines 10—10 of Figure 9.
Figures 11, 12, 13:
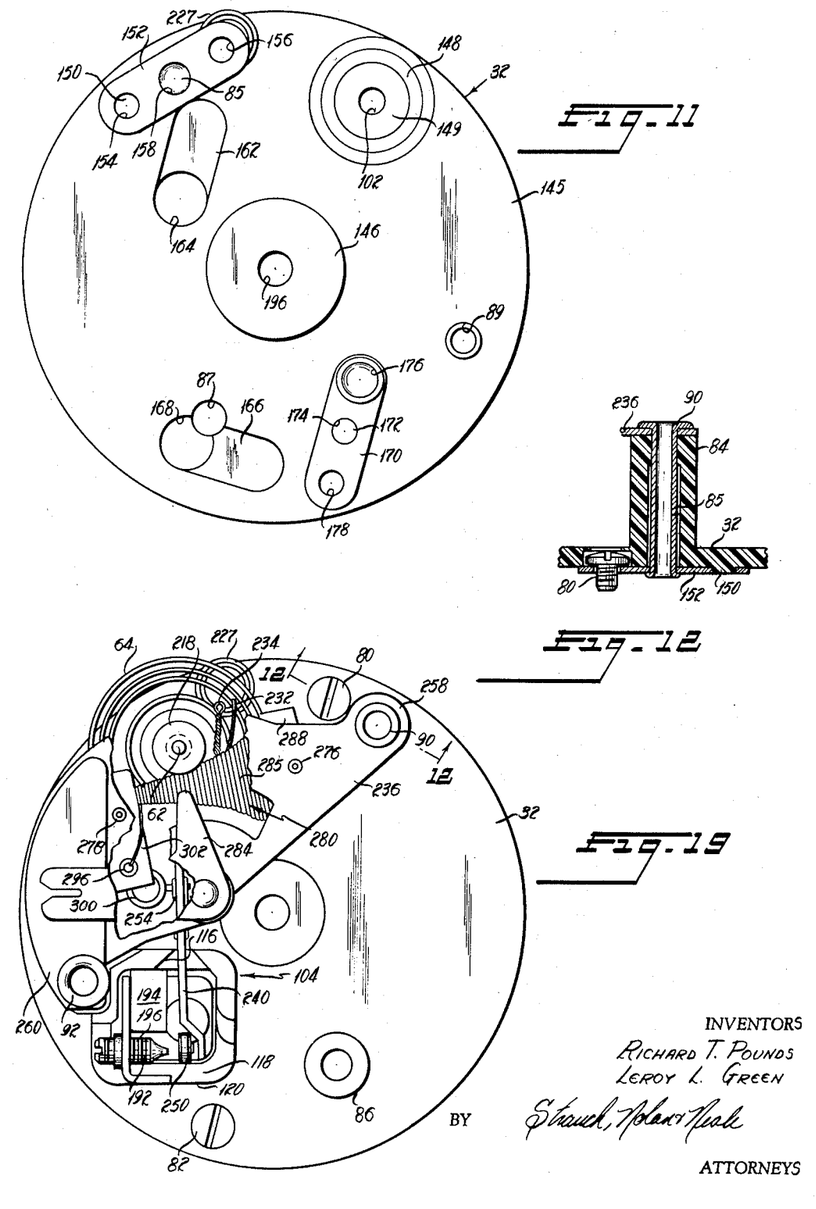
Figure 11 is a plan view of the side of the thermostat base which faces the wall mounting plate in assembly.
Figure 12 is an elevation view in section along lines 12—12 of Figure 19 illustrating a second circuit connection and mechanical assembly of the electrical circuit components through the thermostat base.
Figure 13 is an elevation view of the fixed switch contact sub-assembly.

An upper plan view of base 32 is shown in Figure 6 with the rearward face of base 32 which fits against wall mounting plate 30 shown in Figure 11. Base 32 may be made of the same phenolic material used for constructing wall plate 30 and is preferably molded to have a similar circular external configuration for mounting interiorly of flanged edge 50 on wall mounting plate 30. On upper surface 33 of base 32 there are three outwardly extending posts 84, 86 and 88 which in accordance with one feature of this invention are formed integrally therewith. Posts 84 and 88 are formed with through apertures 85 and 89 for receiving rivets 90 and 92 respectively for a purpose described below and if desired a similar through bore 87 may be provided in post 86.

A central recess 94 is provided in outer face 33 of base 32 to surround aperture 96 which receives screw 56 to provide a bearing surface for nut 98 beneath control arm 46 as best shown in Figures 3 and 4. A similar recess 100 is provided around aperture 102 and acts as a bearing surface for the cantilever bearing support and hub of shaft 62 on which bimetal 64 is mounted. A second concentric and deeper recess 101 is provided to cooperate with surfaces on shaft 62 as will later be explained.

Adjacent post 88 and integral therewith is a novel U-shaped enclosure 104 for the thermostat switch contacts also shown in Figures 4, 6 and 19. U-shaped enclosure 104 includes parallel walls 106 and 108 which are joined at one end by a connecting wall 110 forming the bottom of the U. A slot having angularly related side walls 116 is provided in end wall 110 for receiving the movable switch contact carrying armature bar 240 on bimetal 64 with walls 116 spaced apart a distance adequate to avoid interference with operation of armature bar 240. Bottom surface 114 of the slot is shown in Figure 8. Side walls 116 are angularly related to provide a pilot surface for angularly orienting dial plate housing 34 properly with respect to base 32 as explained below. The open end of U-shaped enclosure 104 includes a low ridge having upper surface 118 extending between the open ends of walls 106 and 108. The outer wall 120 of this ridge acts as a pilot surface for transparent plastic shield 122 shown in Figures 8, 9, 10 and 20.

Shield 122, formed of a material such as polystyrene, has a uniform wall thickness, an open bottom which fits on base 32 and an open back fitting on U-shaped enclosure 104. Front wall 124 is formed with aperture 126 for receiving screw fastener 204 to secure shield 122 to the thermostat. The inner surface 128 of wall 130 on shield 122 abuts against a flat surface 132 on wall 106 of U-shaped enclosure 104. Similarly inner surface 134 on wall 135 of shield 122 abuts against flat surface 136 on wall 108 of the U-shaped enclosure. Inner surface 138 on front wall 124 of shield 122 abuts against surface 120 on base 32 thereby to provide three positioning surfaces for assuring proper location of shield 122 on base 32.

The upper surface of shield 122, best shown in Figures 8 and 9 is formed with a recess to provide an edge surface 140 which abuts against vertical surfaces 142 and 144 on walls 106 and 108 respectively. Shield 122 along with U-shaped enclosure 104 substantially encloses the switch contacts to act as a deterrent against adjustment of the contact by inexperienced persons. Dial plate housing 34, when assembled, fits on top of shield 122 and the upper surfaces of walls 106, 108 and 110 to completely cover the U-shaped enclosure 104 as best shown in Figures 8 and 20.

Referring now to Figure 11 the rearward face 145 of base 32 which fits into wall mounting plate 30 is illustrated and is provided with a central boss 146 concentric with aperture 96 and slightly larger than and beneath recess 94. A second boss 148 concentric with aperture 102 is opposite recess 100 beneath shaft 62 supporting the bimetal spiral 64. Recess 149 is provided in boss 148 for receiving washer 216 and crimped edges 205 of the lower end of shaft 62 as shown in Figure 3.

Apertures 85, 87 and 89 extending through posts 84, 86 and 88 respectively are visible from the rearward surface of base 32. Adjacent aperture 85 is a small boss 150 on which an electrical connecting strip or lug 152 is assembled. Lug 152 is formed from a flat thin strip of metal with hole 154 provided to permit lug 152 to be positioned over boss 150. At the other end a second bore 156 is provided for freely receiving the threaded end of screw fastener 80. A third opening 158 is centrally located to be aligned with aperture 85 whereby a suitable fastener, such for example as rivet 90 best shown in Figure 12, may be used for securing lug 152 to base 32. A shallow recess 162 and adjoining deeper recess 164 is provided which extends over terminal strip 70 (see Figure 5) to give added clearance and provide access to screw 68. A similar shallow recess 166 and deep circular recess 168 are provided on surface 145 of base 32 to cooperate with the other terminal strip 70 on wall mounting plate 30. Surface 145 of base 32 is formed with boss 172 for fitting into hole 174 in lug 170. Lug 170 is provided with apertures 176 and 178 at opposite ends for receiving fasteners which are better shown in Figure 7.

Lug 170 fits flush against surface 145 of base 32 with screw 82 being placed in aperture 178 before lug 170 is secured in position by rivet 180 through hole 176. Base 32 is formed with an enlarged bore 182 opening from surface 145 for freely receiving the head of screw 82 and is provided with a stepped bore 184 of smaller diameter near the outer surface 33 of base 32 thereby to assure screw 82 is not misplaced or lost after assembly of lug 170 to base 32. A similar construction, illustrated in Figure 12, is used for screw 80.

Secured to outer side 33 of base 32 by rivet 180 is a contact and magnet sub-assembly shown also in Figures 6 and 13. The contact magnet assembly as illustrated in Figure 13 comprises a bracket 186 having a base leg 188 having a hole 189 suitably formed for receiving rivet 180 which mechanically secures both bracket 186 and lug 170 to opposite sides of base plate 32 and electrically connects the bracket and lug together. An upwardly extending leg 190 is suitably apertured for threadedly receiving the fixed contact screw 192. A second aperture is provided in leg 190 for receiving a rivet 193 which secures magnet 194 adjacent the fixed contact 192. A thin resilient strip 196 shown in Figure 6 is mounted between magnet 194 and leg 190 of bracket 186 which bears against the threads of fixed contact screw 192 to assure a good low resistance electrical circuit connection between bracket 186 and screw 192. Magnet 194 is formed with a concavity 198 so that the head of rivet 193 which secures magnet 194 to upwardly extending leg 190 of L-shaped bracket 186 is recessed. With reference to Figures 5, 6 and 7, the electrical circuit from the terminal screw 68 in wall mounting plate 30 which receives one of the wires in the electrical control circuit is along lug 70 to aperture 78 which receives screw 82 which in turn makes electrical connection with lug 170 on base plate 32. Rivet 180 connects lug 170 to L-shaped bracket 186 which in turn supports in an electrically conducting relationship fixed electrical contact 192.

Extending inwardly from leg 190 and bent at right angles therewith is extention 200 which contains a threaded aperture 202 and receives fastener 204 (see Figures 8 and 20) to secure shield 122 rigidly with base 32.

Figures 12, 13, 14, 15, 15A:
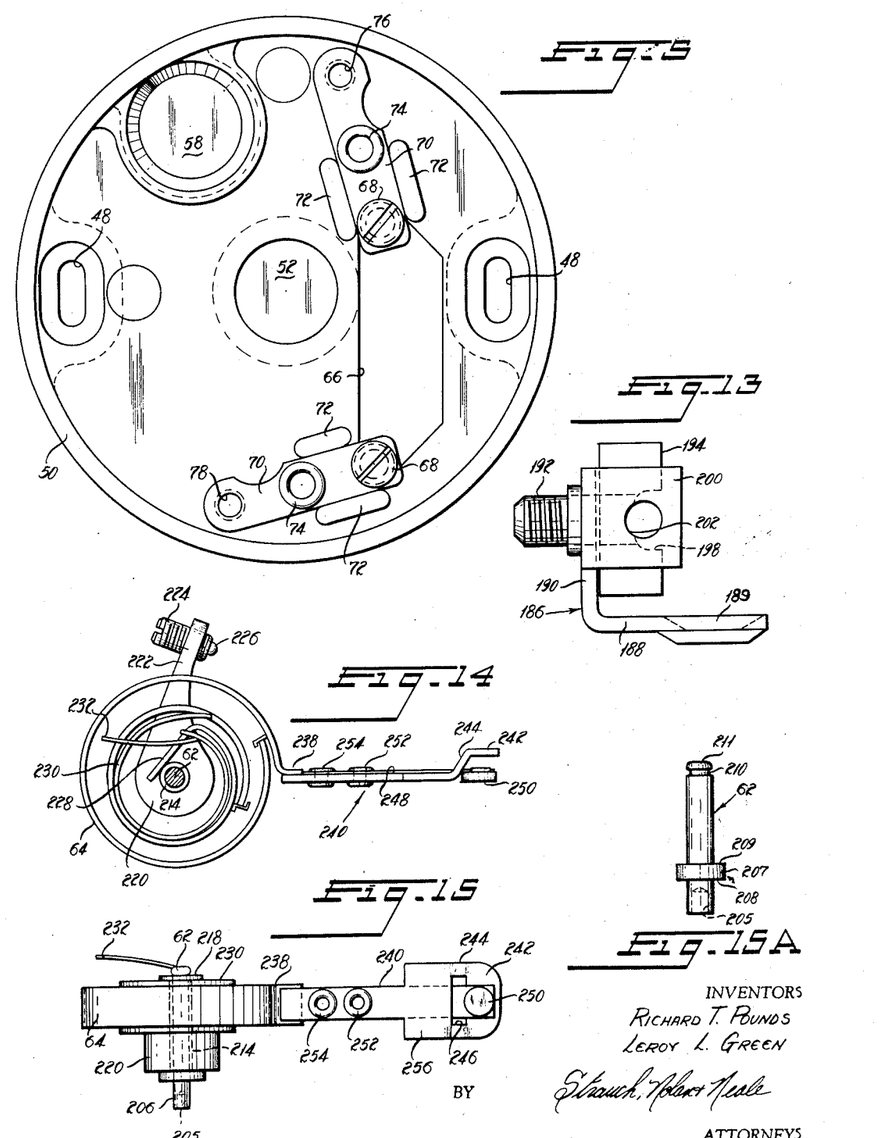
Figure 14 is a plan view of the spiral bimetal temperature sensitive element for the control instrument.
Figure 15 is a view in elevation of the bimetal element of Figure 14.
Figure 15A is a view in elevation of the shaft which supports the bimetal element on the control instrument base.

Referring now to Figures 14 and 15 where bimetal spiral 64 and armature sub-assembly are illustrated, a mounting shaft 62 is provided with a cantilever bearing fitting in aperture 102 in base 32.

Shaft 62, separately shown in Figure 15A and which may be of stainless steel, is generally cylindrical and is provided with an axial bore 205 at lower end 206 which in final assembly may be crimped so as to rigidly secure the shaft to the base. A shoulder 207 is provided having a lower bearing surface 208 cooperating with surface 101 of base 32 and an upper bearing surface 209. An undercut 210 is formed near the upper end 211 of shaft 62.

Referring now to Figures 3 and 15, a bushing 214, which also may be of stainless steel, has an inside diameter slightly larger than the outside diameter of shaft 62 and fits on shaft 62 to be relatively rotatable thereon. Shaft 62 is initially assembled on base 32 and lower end 206 crimped on washer 216 to rigidly secure shaft 62 to base 32.

Hub 220 is formed with an integral cam follower arm 222 and may be made of any suitable material such as metal, insulating material or the like. The free end of arm 222 is provided with a cam engaging surface to act as a follower on cam surface 368 of control arm 46 which is shown in detail in Figure 25. In the illustrated embodiment cam follower arm 222 is provided with a threaded aperture which receives calibration screw 224 provided with a cam follower tip 226 of wear resistant material such as nylon. Spring 227 is provided to bias cam follower arm 222 against cam surface 368.

Hub 220 is formed with an interior bore and pressed onto bushing 214. Bimetal spiral 64 is secured at its inner end 228 as by spot welding to bushing 214 to thus support the spiral and armature 240. Sleeve 214 and its attached parts are then placed on the upper end of shaft 62 and a nylon washer 218 is snapped in groove or undercut 210 to assure bushing 214 does not come off the upper end of shaft 62.

Figures 16, 17:
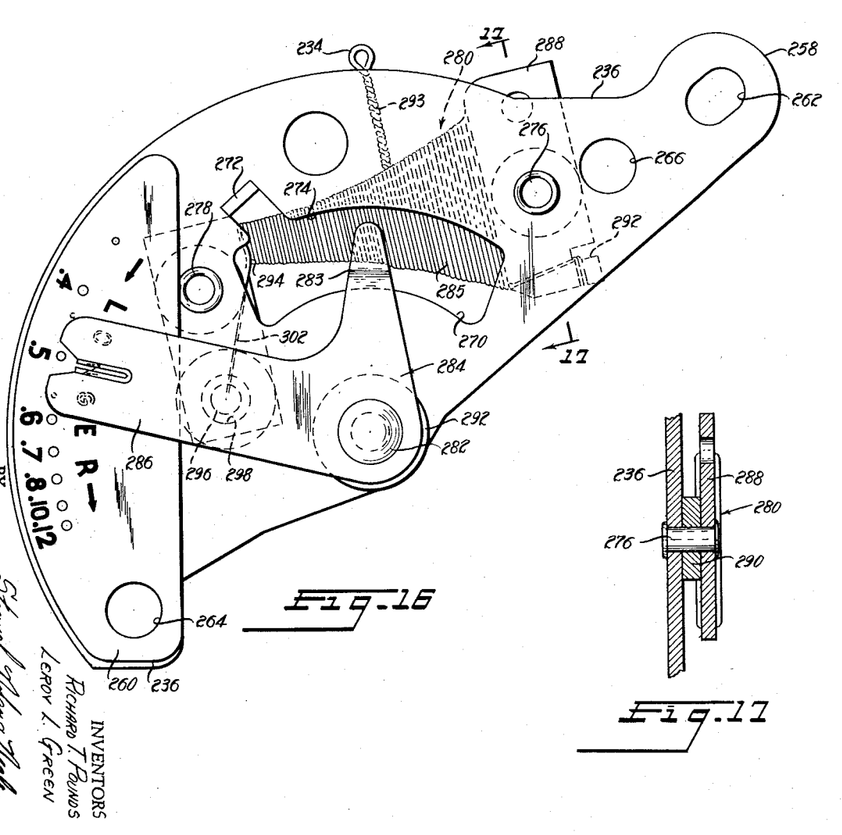
Figure 16 is a plan view of a mounting plate supporting the anticipating heater resistor sub-assembly.
Figure 17 is a view in section along lines 17—17 of Figure 16 showing the assembly of the resistance element on the mounting plate.

A series heater assembly 230 is mounted on the inner spiral of bimetal 64 and includes electrical lead 232 extending freely for connection with loop 234 of the main anticipating heater resistance on mounting plate 236 shown in Figure 16. The other end of series heater assembly 230 is connected to the bimetal adjacent end 228 and the bulk of the resistance wire forming the series heater is supported between two layers of insulating paper as more clearly described and claimed in copending application Serial No. 578,832, filed April 17, 1956, in the name of Chester Bishop and assigned to the assignee of the present invention. The free end 238 of bimetal spiral 64 is bent along a radial line and then secured as by spot welding to armature bar 240 of magnetizable material.

Armature bar 240 extends radially outwardly from bimetal spiral 64 and is formed with an end section 242 offset from the radial line by an angularly bent intermediate section 244. Intermediate section 244 is provided with a rectangular aperture 246 for receiving the contact strip 248 on which movable contact member 250 is mounted. Contact strip 248 is preferably a thin resilient copper strip which is secured as by rivets 252 and 254 to armature 240 to thus provide a floating movement for contact 250 and reduce arcing. Armature bar 240 is provided with an enlarged portion 256 which when assembled as shown in Figures 4 and 19 faces magnet 194 to provide the desired snap action operation and closing and opening of the contacts at an appreciable temperature differential. As best shown in Figure 19, armature bar 240 extends through slot walls 116 of the U-shaped enclosure 104.

Figure 18:
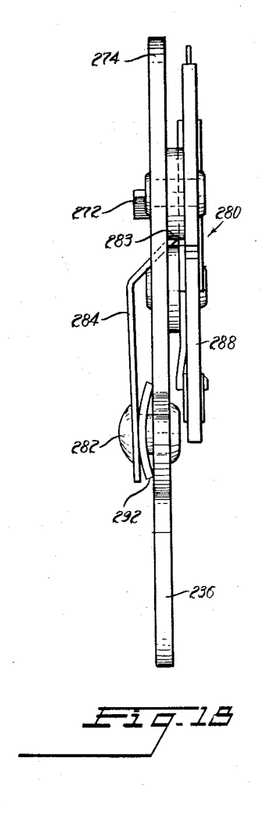
Figure 18 is an elevation view of the mounting plate of Figure 16.
Figure 23:
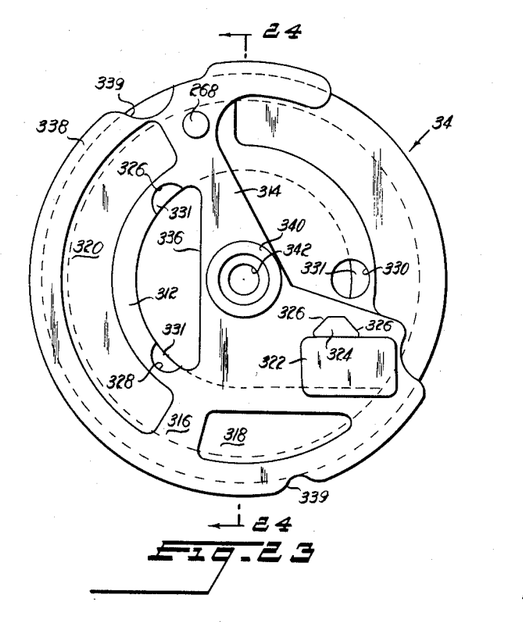
Figure 23 is a plan view of the side of the dial plate housing which faces base 32 of the thermostat.
Figure 24:
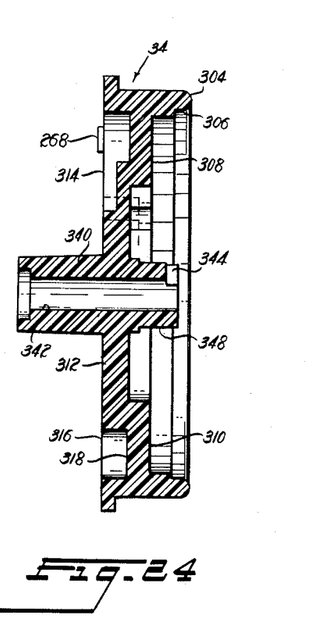
Figure 24 is an elevation view in section along lines 24—24 of Figure 23.

Referring now to Figures 16 through 18, mounting plate 236 is formed on opposite ends with ears at 258 and 260 each having an aperture 262 and 264 which mates with apertures 85 and 89 in posts 84 and 88 of base 32 as best shown in Figure 4. Aperture 266 is suitably formed in plate 236 to serve as a pilot surface by receiving projecting knob 268 on dial plate housing 34 as best shown in Figures 23 and 24. An arcuately shaped slot 270 is provided near the central portion of plate 236 which has a punched ear or projecting strip 272 bent upwardly from outer slot edge 274. Suitable apertures are also provided for receiving rivets 276 and 278 which support resistor plate assembly 280. Journalled for pivotal movement on plate 236 as by rivet 282 is an anticipator pointer 284 formed with one end 283 extending through slot 270 to contact resistance wire 285 on resistor plate assembly 280 and also with an index arm 286 which extends outwardly to the periphery of plate 236 where indicia of heat anticipatory effect are supported. The indicia are provided on a foil having an adhesive applied to the underside thereof to secure the foil to plate 236. Spring washer 292 between anticipator pointer 284 and mounting plate 236 along rivet 282 provides adequate friction to assure that pointer 284 does not inadvertently move but is easily adjustable. Ear 272 provides a stop to prevent excessive movement of anticipator pointer 284 in a clockwise direction and the stop preventing excessive movement in the counterclockwise direction is provided after assembly by the rivet in aperture 264.

Resistor plate assembly 280 comprises a thin flat body 288 of fibrous or other insulating material having two generally rectangular end sections joined by a tapered intermediate section and is provided with holes for receiving rivets 276 and 278 one in each end section. As shown in Figure 17 a small spacer 290 is provided around rivet 276 to separate resistor plate assembly 280 from mounting plate 236. A similar spacer is used around rivet 278 to mount body 288 parallel to mounting plate 236.

An enameled resistance wire 285 has one end inserted in slot 292 and unconnected to any other electrical circuit component in the thermostat. The resistance wire extends from slot 292 around the tapered resistance section. Resistance wire 285 is wound on the tapered intermediate section of body 288 to have an integral twisted section 293 providing loop 234 near the electrical center of the winding and the narrow end 294 is connected by lead 302 to a solder terminal 296. Aperture 298, under index arm 286 in the position illustrated, is formed in plate 236 to provide access to solder terminal 296 after resistor plate assembly 280 is secured to mounting plate 236.

Figure 19 shows mounting plate 236 secured in position on base 232 with ear 258 supported on post 84 by rivet 90 and ear 260 supported on post 88 by rivet 92. Bimetal 64 is mounted below mounting plate 236 in a manner so that a substantial portion of the bimetal spiral is mounted beneath heater resistor winding 285 to be influenced by this localized source of heating. The heating effect from anticipatory heating resistor 285 is entirely by radiation as distinguished from convection or conduction as there is no metallic connection between mounting plate 236 or resistor plate assembly 280 and bimetal 64 or shaft 62 as clearly shown in Figure 3. An electrical pigtail connection 300, also shown in Figure 4, extends from rivet 254 on armature bar 240 to solder terminal 296. An electrical circuit thus extends between fixed contact 192, movable contact 250, armature bar 240, pigtail 254, solder terminal 296, lead 302, resistance wire 285, anticipator pointer 284, metal mounting plate 236 and rivet 90 to electrical conductor lug 152 on the rearward side of base 32. A parallel circuit extends from armature bar 240 through the bimetal as shown in Figure 14 to series heater resistance assembly 230 and pigtail lead 232 to loop 234 formed as part of resistance winding 285. The selection of the electrical circuit parameter values for providing an improved means for adjusting the amount heat anticipation for controlling the operation of the thermostat forms no part of the present invention but is disclosed in greater detail and claimed in the above-identified copending application of Chester Bishop.

Figure 21:
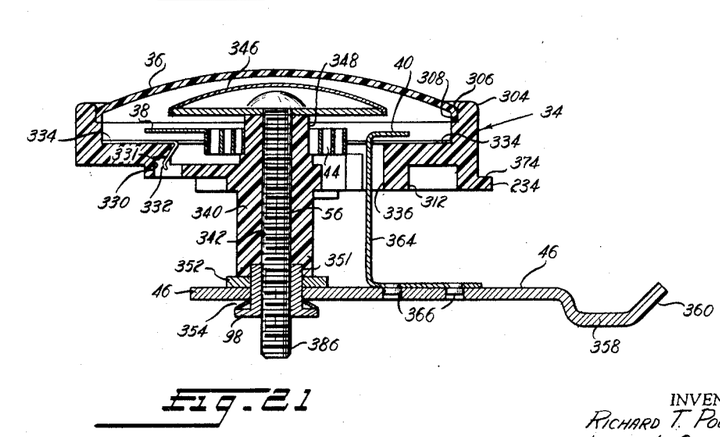
Figure 21 is an elevation view in section of the dial plate housing sub-assembly.
Figure 22:
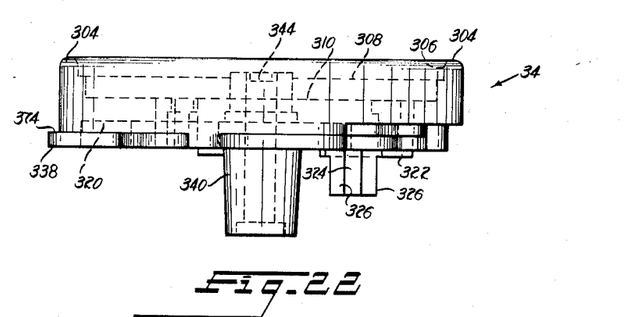
Figure 22 is an elevation view of just the dial plate housing.

In Figure 20, the dial plate housing next to be described is shown mounted on base 32 and in Figure 21 there is illustrated a view in section of just the dial plate housing sub-assembly. The principal component in this sub-assembly is the dial plate housing as shown in detail in Figures 22, 23 and 24. Dial plate housing 34 is formed of a transparent material such as polystyrene and has an outwardly open face surrounded by a peripheral edge 304 with an inside edge 306 forming an inside bore which receives transparent plastic cover 36 snapping into position against surface 308. Parallel to and recessed from surface 308 is a dial plate supporting surface 310 which extends completely around the interior of housing 34. Beneath surface 310 is an arcuately shaped reinforcing ridge 312 which extends between a radially directed ridge 314 and a similar section 316 both of which extend outwardly to the periphery of housing 34. Recesses 318 and 320 are provided to reduce the total quantity of plastic material used in forming housing 34. A rectangular platform or boss 322, best shown in Figures 22 and 23, in assembly fits inside the walls forming the U-shaped enclosure 104 on base 32. Projection 324 extends rearwardly from boss 322 toward base 32 and is formed with angularly related side surfaces 326 which mate with correspondingly angularly related walls 116 on U-shaped enclosure 104 to further aid proper assembly of housing 34 with base 32. A further circular boss 268 is provided on radially directed ridge 314 for cooperating with aperture 266 on mounting plate 236.

Semi-circular recesses 326, 328 and 330 are each formed adjacent through openings and have a bottom ledge 331 for receiving retaining clips 332 on dial plate 334 one of which is clearly shown in Figure 21. Aperture 336 of appreciable size is provided to receive arm 364 carrying index 40 and to form in conjunction with the aperture adjacent recess 330 an air circulation path through dial plate housing 34. Ledge 338 extends generally peripherally around housing 34 as best shown in Figures 4, 20 and 23 and is formed with recesses 339 adjacent screw fasteners 80 and 82 as shown in Figure 20 to provide screw driver receiving openings whereby diametrically located screws 80 and 82 are accessible after assembly of the thermostat for mechanically securing the thermostat to wall mounting plate 30 and simultaneously completing the electrical circuit. The ledge is also omitted or cut away in the vicinity of mounting plate 236 and particularly along the region where anticipator pointer index arm 286 is accessible for adjustment.

Referring now to Figures 21 through 24, centrally of housing 34 there is provided hub 340 which contains a central through bore 342. Hub 340 is provided with a slot 344 adjacent its outer end forming a positioning surface for properly orienting a button assembly which includes a name plate cover 346 mounted on screw 56. Beneath name plate cover 346 and on the peripheral surface 348 of hub 340 there is mounted a spiral bimetal thermometer 44 having pointer 38 cooperating with the indicia on the left hand side of the scale plate 334 as shown in Figures 1 and 20. The position of the bimetal 44 on surface 348 of hub 340 may be adjusted for calibration after assembly and is preferably secured thereto as by use of suitable adhesive. The lower end of bore 342 in hub 340 is provided with a suitable counterbore for receiving bearing nut 98 which fits on screw 56 and which is formed with a cylindrical extension 351 fitting into the open end of hub 340 to provide a metal support for washer 352, control arm 46 and spring washer 354.

Figures 25, 26, 27:
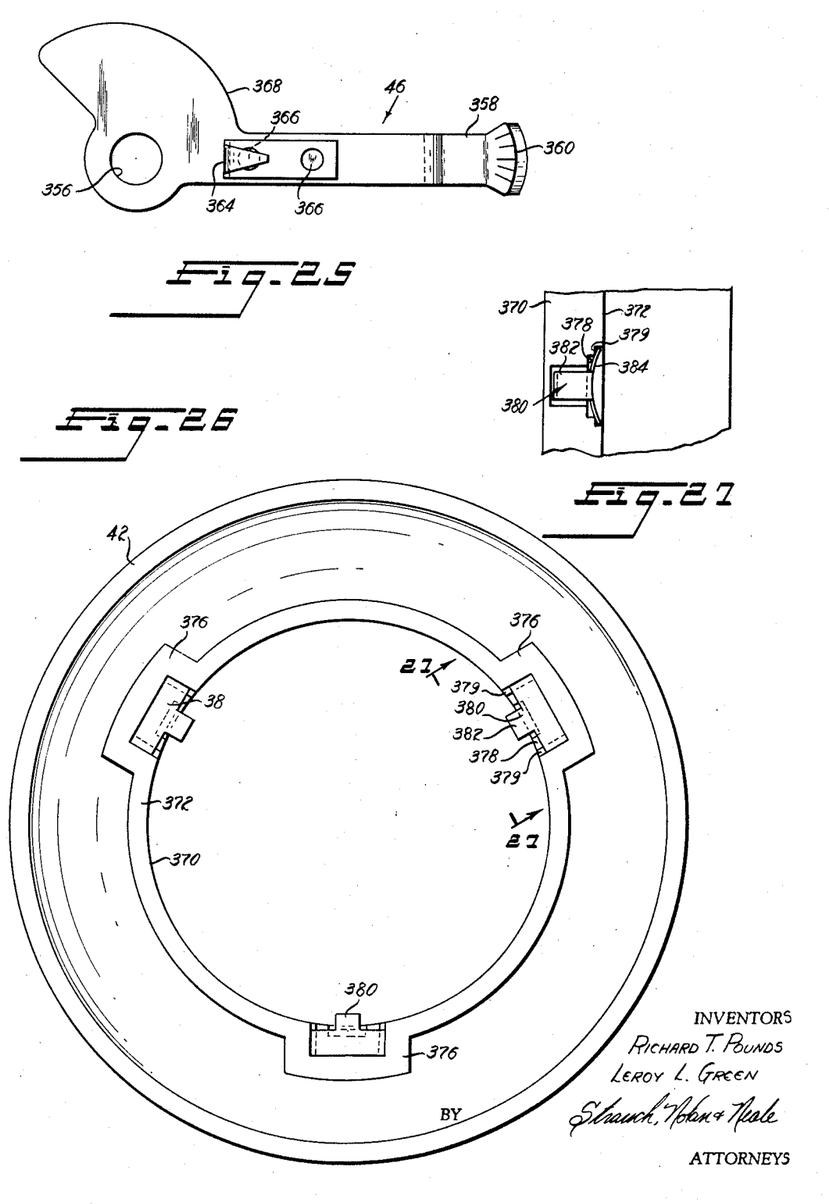
Figure 25 is a plan view of the thermostat control arm.
Figure 26 is a plan view of the thermostat cover showing the interior of the cover which fits over the thermostat.
Figure 27 is a partial elevation view along lines 27—27 of Figure 26 illustrating the spring clips which secure the cover to the dial plate housing.

Control arm 46, best shown in Figures 21 and 25, is provided with an aperture 356 through which bearing nut 98 freely extends and contains a handle extending longitudinally outwardly and beneath removable cover 42 as shown in Figures 2 and 4. An offset portion 358 is provided adjacent the free hand engaging end 360 to extend beneath the rearward edge 362 of cover 42.

Control arm index 40 is supported on control arm 46 by outwardly extending member 364 which is secured to arm 46 as by a pair of rivets 366 and extends through aperture 336 of dial plate housing 34. A variable radius cam surface 368 is provided for controlling the position of bimetal 64 by controlling the position of arm 222 through contact with cam follower tip 226 on screw 224.

With reference now to Figures 1, 3, 26 and 27, removable cover 42 is shown as formed with a substantially uniform wall thickness and having a generally circular convex outer surface with a central opening defined by wall 370. An inside flat surface 372 adjacent wall 370 is provided which abuts against surface 374 of ridge 338 on dial plate housing 34. Surface 372 in cover 42 is provided with three ledges 376 symmetrically spaced around the periphery of the central opening. Ledges 376 are each formed with a recess 378 including a shoulder 379 into which retaining clips 380 are mounted. Retaining clips 380 may be of any suitable design and are preferably formed from T-shaped resilient material with the leg 382 of the T bent to form an obtuse angle slightly greater than 90 degrees with head 384 as shown in Figure 3. Head 384 is slightly longer than recess 378 so that insertion of the retaining clip in the recess causes a slight bowing of retaining clip head 384 whereby it frictionally holds itself in recess 378. An adhesive or glue is preferably also applied after assembly. Arms 382 resiliently grasp the outer peripheral wall 304 of dial plate housing 34 to provide a rigid assembly without the use of screw fasteners which will stay permanently in place during normal operation but which is easily disassembled if it becomes necessary to repair or replace the thermostat.

For assembly, the wall mounting plate 30 requires the pair of lugs 70 thereto and the insertion of screws 68. After base 32 has been molded, screw 82 is placed in lug 170 and the magnet and contact assembly including bracket 186 are secured to base 32 by rivet 180. Shaft 62 which supports the bimetal is assembled in position and bimetal spiral 64 and armature bar 240 secured on bushing 214 as a sub-assembly are then assembled on shaft 62 and washer 218 snapped in position. Shield 122 may then be assembled at any subsequent time as desired. Anticipatory heater metal mounting plate 236 is first completed as a sub-assembly and then secured to posts 84 and 88 by rivets 90 and 92 to form a principal base sub-assembly. Before rivet 90 is put in position, screw 80 is inserted in lug 152 and the mounting plate sub-assembly placed in position to be mechanically secured to base 32 by rivet 90 which also provides a low resistance electrical connection from mounting plate 236 through post 84 of base plate 32 to lug 152.

The solder connection of pigtail 300 to terminal 296 illustrated in Figure 19 is then made and lead 232 from series heater 230 on the bimetal 64 connected to loop 234 of the heat anticipator winding 285 to complete the electrical circuit through the thermostat. The dial plate housing sub-assembly as shown in Figure 21 is next completely assembled first by inserting scale plate 334 and bimetal thermometer 44 in position, then inserting screw 56 through bore 342 with control arm 46 held in position by bearing nut 98. Transparent cover 36 is snapped into position and the dial plate sub-assembly is then ready for assembly on base 32.

Cam follower 222 is held by hand against the bias of spring 227 until cam 368 on control arm 46 is placed in position and the free end 386 of screw 56 inserted through the central aperture 96 in base 32. Cam follower arm 222 is then released and nut 54 started on screw 56 to rigidly secure dial plate housing 34 and its associated sub-assembly to base 32. Housing 34 is rotationally adjusted until pilot surfaces including projection 324 with its angular surfaces 326 are positioned against angularly related surfaces 116 and U-shaped enclosure 104 and boss 268 on dial plate housing 34 is in hole 226 on metal mounting plate 236. When nut 54 is tightened, the entire dial plate housing 34 and base 32 are rigidly secured together with the only movable element being control arm 46 with its index pointer 40 cooperating with the right hand scale indicia in dial plate housing 34 to indicate the temperature setting which affects the closing and opening of switch contacts controlled by bimetal 64. Final temperature calibration is made by the adjustment of cam follower screw 224 in control arm 222 on shaft 62 supporting bimetal 64 and a suitable seal is applied to prevent further adjustment after factory calibration. The operating differential of 2° or 3° for the opening and closing of switch contacts 192 and 250 is set by the adjustment of fixed contact 192 adjacent magnet 194.

The entire thermostat assembly is then ready to be secured to wall mounting plate 30 by screws 80 and 82 which fit into the threaded openings 76 and 78 respectively on lugs 70 in the wall mounting plate 30. Thus, simultaneously with mechanically securing the thermostat in position on wall plate 30 the electrical circuit through the thermostat is completed. Final adjustment of anticipator heater control index arm 286 is then made as determined by the control circuit current and removable cover 46 placed in position. Cover 46 extends almost substantially in alignment with the outer surface of base 32 and peripherally extends beyond the outer diameter of wall plate 30 by a distance of approximately ¼ inch to provide adequate circulation of air into the thermostat to assure accurate operation in response to the ambient air temperature in the room. The limit positions of the adjustment of control arm 46 are provided by posts 84 and 86, and post 86 additionally serves as a third support for dial plate housing at a position to provide complete rigidity to the assembly.

There is thus provided by the present invention a compact construction which is rugged and yet highly sensitive, and because of its novel orientation and arrangement of parts is readily adaptable for assembly line techniques to provide an improved thermostat of simple construction which is inexpensive to manufacture.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A temperature sensitive control instrument comprising in combination a round substantially flat base having a centrally located bore, a post extending through said bore outwardly from said base and carrying at its outer end a housing enclosing a scale plate having indicia of temperature, a temperature sensitive element including electrical switching means controlled thereby mounted on said base at a position spaced from said central bore and between said housing and said base, an adjustment member mounted for pivotal movement about said post and operative to regulate the control point of said temperature sensitive element, an arm secured to said adjustment member extending between said housing and said base at a location spaced from said post and free of interference with said temperature sensitive element, and an index movable with said arm cooperating with the temperature indicia on the scale plate.

2. In combination: a base having a centrally located bore adapted to be mounted on a vertical wall; a temperature sensitive element for controlling the opening and closing of electrical switching means mounted on said base at a position spaced from said central bore; a sub-assembly comprising: a post adapted to extend through said centrally located bore, a housing enclosing a scale plate carrying indicia of temperature and having a centrally located hub fixedly mounted on said post, a thermostat adjustment member mounted for pivotal movement on said post relative to said housing effective to regulate the control point of said temperature sensitive element, means securing said thermostat adjustment member to said post at a position between said hub and said base, and means controlled by the position of said adjustment member including an index cooperating with said indicia on the housing.

3. The combination as defined in claim 2 wherein the scale plate is mounted parallel to said base with the temperature indicia disposed about said post, a second set of temperature indicia on the opposite side of said scale plate also similarly disposed about said post, and a bimetal spiral secured to said hub and having a pointer cooperating with said second set of indicia.

4. In a thermostat, base of moldable insulating material having a centrally located bore, a temperature sensitive element for controlling the operation of electrical switching means supported on said base at a position spaced from said central bore, a plurality of outwardly extending members formed integrally with said base and projecting beyond said temperature sensitive element, a mounting plate extending between and secured on the outer ends of at least two of said plurality of outwardly extending members and covering at least a portion of said temperature sensitive element, a dial plate housing having a central hub and being formed with pilot surfaces adapted to mate with said mounting plate and another of said plurality of outwardly extending members and having a central bore in its central hub axially aligned when assembled with the bore in said base, and means securing said housing and said base together.

5. The thermostat as defined in claim 4 wherein said last mentioned means comprises a post secured to and extending through the bores in said hub and in said base and further including a thermostat adjustment member mounted for pivotal movement about said post and extending radially from said post outwardly between said housing and said base operative to adjust the control point of said temperature sensitive means.

6. In a temperature sensitive control instrument including switch contacts having an appreciable operating differential, a base of insulating material, a shaft rigidly secured at one end in said base and extending outwardly therefrom, a bushing mounted for pivotal movement on said shaft, a bimetal element secured at one end to said bushing and controlling operation of said switch contacts, a pair of outwardly extending members formed integrally with said base and projecting beyond said bimetal element, a mounting plate extending between and secured on the outer ends of said outwardly extending members and covering at least a portion of said bimetal element, and means mounted for pivotal movement on said base about an axis remote from said shaft for adjusting the operating temperature of said switch contacts.

7. The temperature sensitive control instrument as defined in claim 6 further including a dial plate housing formed with a pilot surface adapted to mate with said mounting plate and supported on the outer side of said mounting plate, means securing said housing to said base including a post secured through said housing to said base, a scale plate in said housing and an index cooperating with said scale plate for indicating the position of the temperature adjustment means.

8. In a thermostat, a base of moldable insulating material having a centrally located bore, a temperature sensitive element for controlling the operation of electrical switching means supported on said base at a position spaced from said central bore, a plurality of outwardly extending members formed integrally with said base projecting beyond said temperature sensitive element, a mounting plate extending between and secured on the outer ends of at least two of said plurality of outwardly extending members and covering at least a portion of said temperature sensitive element, and an anticipating heater winding supported in insulated and spaced relation from the side of said mounting plate facing said temperature sensitive element.

9. The thermostat as defined in claim 8 further including a slider mounted for pivotal movement on said mounting plate and having one end in electrical contact relation with said anticipating heater winding and a portion manually movable on the side of said mounting plate opposite said base, indicia of anticipatory heating effect on said last mentioned side of the mounting plate and an index controlled by the position of said slider cooperating with said indicia.

10. The thermostat as defined in claim 9, wherein said mounting plate is formed with an elongated opening arcuately disposed about the pivotal axis of said slider and the contact between said slider and said anticipating heater winding is on the side of said heater winding facing said mounting plate.

11. In a thermostat, a base of moldable insulating material having a centrally located bore, switch contacts including a fixed contact member supported on said base and a movable contact member, a temperature sensitive element supported on said base at a position spaced from said central bore and carrying on its free end said movable contact member, a plurality of outwardly extending members formed integrally with said base and projecting beyond said temperature sensitive element, one of said outwardly extending members comprising a U-shaped wall with the side of the wall corresponding to the bottom leg of said U being slotted to receive the free end of said temperature sensitive element adjacent said movable contact whereby said switch contacts are on opposite sides of the slotted wall from said bimetal element, a dial plate housing mounted on the free ends of said outwardly extending members and having a projecting surface complementary to the sides of said slot in the slotted wall for facilitating positioning of the housing on the base and a central bore axially aligned when assembled with said bore in said base, and means securing said housing and said base together.

12. The thermostat as defined in claim 11 further having a shield formed of insulating material enclosing the open end of said U-shaped wall to render said switch contacts inaccessible.

13. In a thermostat, a base of moldable insulating material, a bimetal element supported on said base and having a movable free end carrying a switch contact, a plurality of walls integral with said base forming a three sided U-shaped enclosure projecting outwardly from said base, a slot in one of said sides through which the free end carrying said switch contact is mounted thereby positioning said contact within said enclosure, an L-shaped metal bracket having one leg lying on said base within said U-shaped enclosure, a permanent magnet and fixed contact secured to the other leg of said bracket and positioned to be in operative relation with said movable contact, an electrically conductive strip on the side of said base under said one leg, and fastener means securing said one bracket leg and said electrically conducting strip to said base and forming an electrical circuit connection therebetween.

14. The thermostat defined in claim 13 together with means including an insulation shield completely enclosing said U-shaped enclosure.

15. The thermostat as defined in claim 14 wherein said insulation shield comprises a member having parallel sides mating with the sides forming the open end of said U-shaped enclosure, a side joining said parallel sides enclosing the open end of said U-shaped enclosure, an aperture in one of said sides, and fastener means in said aperture secured to said bracket.

16. The thermostat as defined in claim 13 wherein said magnet is recessed on the side facing said free end carrying said movable switch contact and including fastener means in said recess for securing said magnet to said other leg of said metal bracket.

17. In a thermostat, a circularly shaped wall mounting plate adapted to be mounted with one side against the wall of the room in which the temperature is to be controlled, an aperture in said plate, a pair of elongated metal lugs secured on the other side of said plate for receiving one end of wires from the equipment to be controlled, a threaded opening in each of said lugs, said metal lugs being so disposed as to locate said threaded openings at substantially diametrically opposite side edges of said plate, a thermostat including a base of moldable insulating material adapted to be secured to said wall mounting plate with one side of said base facing said other side of said mounting plate, a pair of spaced elongated electrical terminal strips on said one side of said base each having an aperture aligned with the threaded openings in said wall plate lugs, apertures in said base aligned with the aperture in said terminal strips, a screw loosely received in each of the apertures in said terminal strips and adapted to be threadedly received in the threaded openings in wall plate lugs with the diameter of the screw head being larger than the diameter of either of the adjacent apertures in the base or terminal strip to retain said screws in a loose manner between said base and said terminal strips, means including a fastener of conducting material at each of said terminal strips to secure said terminal strips to the base, and a pair of electrically conducting members on the other side of said base each secured to the base by said terminal strip fasteners to form electrical circuit connections to the circuit elements of said thermostat.

18. The thermostat as defined in claim 17 further including a temperature sensitive element controlling operation of switch contacts having an appreciable operating temperature differential supported on said other side of said base, a plurality of outwardly extending members formed integrally with said base extending beyond said temperature sensitive element, a metal mounting plate on the outer ends of a pair of said outwardly extending members, and electrical circuit connections from one of said terminal strip fasteners to one switch contact and from the other switch contact to said metal plate, said other terminal strip fastener extending through one of said outwardly extending members to mechanically secure and electrically connect said metal mounting plate to the other of said terminal strips.

19. In a thermostat, a base formed of insulating material, a pair of spaced electrical terminals formed of rigid strips of conducting material mounted on one side of said base, a bracket on the other side of said support member opposite one of said electrical terminals, fastener means making a low resistance electrical connection between and mechanically securing one of said electrical terminal strips and said bracket together on opposite sides of said base, a fixed switch contact supported by said bracket, a bimetal element carried on said base controlling movement of a movable contact operatively positioned adjacent said fixed contact, a plurality of spaced posts formed integrally with said base, a metal mounting plate on the outer ends of a pair of said posts, electrical circuit means connecting one of said switch contacts to said mounting plate, and fastener means extending through one of said plurality of posts to mechanically secure and electrically connect with a low resistance path said metal mounting plate and the other of said electrical terminal strips.

20. In a thermostat control element having a base, a spiral bimetal element supported at one end by a shaft mounted on said base and carrying at its free end electrical circuit switching means comprising a rigid member of magnetically attractable material secured at one end to the free end of said spiral bimetal and having an off-set section at its other end, a central opening in said magnetically attractable member adjacent off-set section, a flexible strip of conducting material secured adjacent the free end of said spiral bimetal to move with said magnetically attractable member and extending through said opening, an electrical contact element secured to said flexible strip adjacent said off-set end of said magnetic member, and a fixed contact including a permanent magnet adjacent said fixed contact and secured to said base so as to provide an attracting force on said magnetically attractable member between said off-set portion and the free end of said bimetal spiral.

21. The thermostat control element as defined in claim 20 further including an L-shaped bracket secured to said base having one leg extending perpendicularly from said base, a fixed contact element adjustably supported by said one leg and adapted to engage said contact element on the flexible strip.

22. The thermostat control element as defined in claim 21 wherein said permanent magnet is formed with a central concavity and is secured to said one leg of the bracket by a fastener extending through the permanent magnet at said concavity.

23. The thermostat control element as defined in claim 22 wherein said magnetically attractable member is enlarged at the region of said permanent magnet to provide magnetizable material immediately facing sections of the permanent magnet on opposite sides of said concavity.

24. A dial plate housing sub-assembly for use with a control instrument comprising a base having a peripherally outwardly extending wall surrounding said base, a calibrated scale plate secured to one side of said base within said wall, a boss extending from the other side of said base and containing a through aperture, a post extending through said aperture and containing at the end remote from said housing a control instrument adjustment member mounted for pivotal movement about said post, means securing said control instrument adjustment member to said post, an arcuate slot in said base adjacent said scale plate, and an index fastened to said control instrument adjustment member for movement therewith, said index including a portion extending through said arcuate slot and a portion cooperating with said scale plate.

25. The sub-assembly defined in claim 24 wherein said boss extends through said base to provide on said one side of said base a centrally located hub, a spiral bimetal thermometer mounted on said hub and carrying at its free end an index cooperating with said scale plate.

26. In a temperature sensitive control instrument having switch contacts, the combination comprising the base, a shaft rigidly secured at one end in said base and extending perpendicularly therefrom, a bushing mounted for pivotal movement on said shaft, a bimetal element secured at one end to said bushing and being responsive to ambient temperatures for controlling operation of the switch contacts, a hub secured to said bushing, temperature adjustment means pivotally mounted on said base, and cam means extending from said temperature adjustment means and operatively engaging said hub for adjusting the operating temperature of the switch contacts.

References Cited in the file of this patent

UNITED STATES PATENTS

| | | |
|---|---|---|
| 2,315,533 | Malone | Apr. 6, 1943 |
| 2,729,719 | Kronmiller | Jan. 3, 1956 |